UNITED STATES PATENT OFFICE 2,414,999

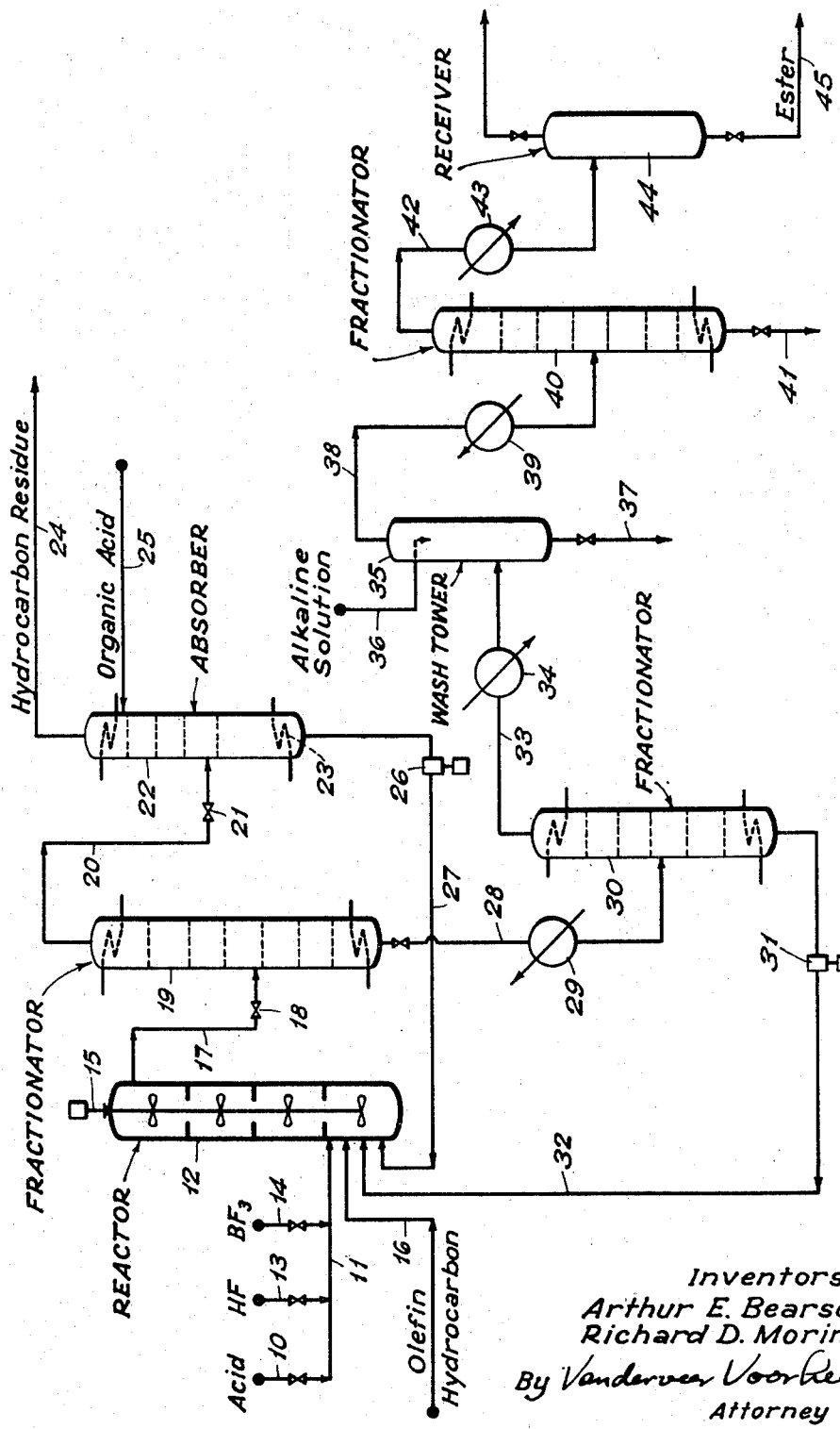

ESTERIFICATION PROCESS

Arthur E. Bearse and Richard D. Morin, Columbus, Ohio, assignors, by mesne assignments, to Standard Oil Company, Chicago, Ill., a corporation of Indiana Application June 27, 1944, Serial No. 542,427

9 Claims. (Cl. 260—497)

This invention relates to a process for the manufacture of esters of organic acids and more particularly to the preparation of esters by interaction between organic acids or their anhydrides and ethylene in the presence of a catalyst. The invention relates still more particularly to the use of a highly effective catalyst for the ethylene esterification reaction.

One object of the invention is to provide a catalyst for esterification of ethylene present in commercial hydrocarbon mixtures such as the unsaturated hydrocarbon fractions obtained in the cracking process. Another object of the invention is to provide a more effective catalyst for esterification, thereby reducing the time required for esterification of ethylene, reducing the amount of ethylene lost in side reactions, and increasing the conversion per pass. Still another object of the invention is to provide an effective esterification catalyst which can be separated from the esterification products and recycled for the treatment of further quantities of ethylene.

The invention is illustrated by a drawing which shows diagrammatically an apparatus for carrying out the process.

Numerous catalysts have been proposed for esterification of olefin hydrocarbons such as ethylene, propylene, the butylenes, amylenes, etc. Sulfuric acid has been used for this purpose. When using sulfuric acid it is usually necessary to employ a substantial amount of the sulfuric acid in relatively concentrated form and recover the product by diluting the acid, thus requiring reconcentration of a large amount of sulfuric acid in order to make the process complete. When aluminum chloride is employed it is generally necessary to destroy the anhydrous aluminum chloride by adding water in order to recover the desired ester from the reaction products. Various other catalysts have been used such as phosphoric acid, boron fluoride ($BF_3$), hydrofluoric acid (HF), HCl, etc.

We have now discovered that if $BF_3$ is combined with HF and a suitable organic acid, unsaturated compounds such as olefin hydrocarbons and their derivatives which do not react adversely with $BF_3$ or HF can be esterified with the mixture at a much more rapid rate with the production of larger amounts of the desired ester than obtainable with either of these catalysts alone. Polymerization of the olefin is kept at a minimum. Furthermore, as a result of the high efficiency of our new catalyst we have found it possible to esterify olefin hydrocarbons contained in commercial hydrocarbon mixtures, for example, the $C_2$ gas streams obtained in the cracking of petroleum oils, thus making it unnecessary to employ pure ethylene for the continuous operation of the process. Olefinic hydrocarbons suitable for our process may also be obtained by the dehydrogenation of paraffin hydrocarbons, for example by the action of a dehydrogenation catalyst such as molybdenum oxide on alumina at elevated temperature in the range of 800 to 1100° F.

Instead of adding $BF_3$ as such we prefer to first form an addition compound between the $BF_3$ and the organic acid to be esterified, its anhydride, or its ester, or an ether, and then add this compound to the reaction vessel. Alternatively, we may add boric acid or other compound of boron which is capable of forming $BF_3$ by reaction with HF. Any water formed by such a reaction may be removed by any suitable means as by the addition of an organic acid anhydride, a ketene, an organic acid halide, or other compound which reacts readily with water to form an organic acid or other substance which does not interfere with the subsequent ester formation.

If desired, additional catalyst may be employed in conjunction with HF—$BF_3$. Thus we may add small amounts of certain metals, e. g. copper, nickel, or silver, to accelerate the reaction or for other reason.

The catalyst remaining in the reaction mixture, after completion of the reaction between the organic acid and ethylene, may be reused after separating the desired ester from the crude reaction products. Thus any low-boiling materials which contain HF or fluorinated compound or any high-boiling materials which contain addition compounds of $BF_3$ and oxygenated organic compounds may be separated from the ester, for example by distillation, and recycled to the reactor.

We prefer to carry out the reaction under substantially anhydrous conditions to insure rapid reaction and avoid corrosion of metallic equipment. Small amounts of water may be tolerated, but larger amounts tend to decrease the reaction rate. Under our preferred reaction conditions, less than one mol of water per mol of $BF_3$ should be present. In order to keep the reaction mixture substantially anhydrous, we may add an acid anhydride or other substance to react with any water present.

The order of the addition of reactants and catalysts affects the yields of ester obtained. We prefer to mix the catalysts with the carboxylic acid before adding the olefinic compound. In some cases the olefin may be charged in solution or in admixture with organic acid.

The most favorable reaction temperature depends on the nature of the carboxylic acid employed. In general, temperatures between 0° C. and 300° C. may be used but we prefer to use temperatures between 50° C. and 200° C.

In some instances it may be desirable to use an excess of ethylene over and above the amount theoretically required to combine with all the carboxylic acid present, and where substantially pure ethylene is used, the excess may be recycled. However, according to our preferred conditions, the concentration of organic acid is maintained relatively high in proportion to the ethylene content of the reaction mixture for example 10:1 to 100:1. This is readily accomplished when carrying out the reaction in a continuous manner, in which case the excess of organic acid is recycled or it may be retained in the reaction mixture while the ester product is removed by vaporization.

Referring to the drawing, the organic acid is introduced at 10 thru line 11 leading to reactor 12. A typical acid for the process is glacial acetic acid and various other organic acids may be employed, particularly the lower molecular weight fatty acids, formic acid, propionic and butyric acids, also tannic, oleic, phenyl acetic and stearic acids, dibasic acids such as oxalic, maleic, adipic, and phthalic, and aromatic acids such as benzoic acid. Substituted acids such as mono-, di- and trichloracetic acids and nitrobenzoic acid may be used. Partially esterified acids such as an acid ester of phthalic acid may be employed. In the case of the crystalline acids, they may be introduced into the reactor in solution in an inert solvent or they may be introduced in the form of a fine powder suspended in a slurry or by means of a mechanical feeder. In the case where dibasic acids are employed, the esterification reaction may be controlled to give either the neutral ester or the acid ester.

It is generally desirable to introduce the HF—BF₃ catalyst in solution in the acid, as indicated in the drawing by HF induction line 13 and BF₃ induction line 14. The amount of HF—BF₃ catalyst employed will in general be at least 2% based on the acid employed. We prefer to use an amount of HF—BF₃ catalyst equal to about 2% to 20% based on the carboxylic acid. Likewise the ratio of BF₃ to HF will usually be about 1:1 although this may be varied in the range of about 10:1 to 1:10. The preferred range of catalyst composition is 2:1 to 1:3 BF₃:HF ratio.

Reactor 12 is provided with an efficient agitator 15, preferably providing an elongated highly agitated path for the reacting ingredients. The olefin hydrocarbon introduced by line 16 is intimately mixed with the acid-catalyst reagent and is rapidly esterified, the reaction mixture leaving the reactor by line 17. Pure ethylene may be employed or commercial mixtures of ethylene with paraffin hydrocarbons may be used. When mixed olefins are employed, the resulting esters may often be fractionated from each other more readily than the olefins from which they are made. Sufficient pressure is maintained on the reactor to keep the reaction mixture largely in liquid phase and substantially to suppress vaporization. In the case of ethylene the pressure will reach a maximum of 1400 pounds per square inch at the reaction temperature, e. g. 100 to 150° C., then gradually fall as the reaction proceeds. At 170° C. a pressure of 1800 pounds per square inch was obtained. The solubility of gaseous olefines in the organic acid is increased by pressure.

The reaction products from line 17 flow through pressure reducing valve 18 to fractionator 19. From the top of fractionator 19 there is withdrawn by line 20 a vapor stream containing paraffin hydrocarbons with some unreacted olefins together with hydrogen fluoride catalyst. This stream passes through valve 21 to absorber 22 which may contain a reboiler coil 23. Feed acid for the process, e. g. glacial acetic acid may be supplied to the arbsorber by line 25 in an amount sufficient to absorb most of the hydrogen fluoride from the hydrocarbon vapors. The denuded vapors are discarded from the process by line 24 while the acid is conducted through pump 26 in line 27 to reactor 12 for the treatment of further quantities of olefins.

From the bottom of fractionator 19 there is withdrawn by line 28 a liquid stream containing esterification product, unreacted organic acid and boron trifluoride in the form of complexes with the oxygenated organic compounds. This stream passes through heater 29 into fractionator 30 wherein crude ester is distilled off through vapor line 33 and condenser 34, thence to the wash tower 35 wherein acidic impurities are removed by washing with water or dilute alkali solution introduced through line 36. The aqueous layer collecting in the bottom of the wash tower may be withdrawn through line 37 as required while the esterification product is transferred by line 38 through heater 39 into fractionator 40 wherein the ester is distilled off through vapor line 42 and condenser 43, thence collected in receiver 44 from which the product is withdrawn by line 45. From the bottom of fractionator 40 higher boiling substances may be withdrawn through line 41.

From the bottom of fractionator 30 there is withdrawn a liquid stream containing principally unreacted organic acid and boron fluoride, the latter in the form of complexes with the organic acid, HF, ester and/or with other oxygenated compounds. This stream is conducted by pump 31 in line 32 back to reactor 12 for the treatment of further quantities of olefins.

It should be understood that other methods may be employed for recovering the products of the esterification reaction. Thus in some operations the reaction products may, by settling or centrifuging, be separated into layers or separate phases which may be handled separately. For example, where an inert hydrocarbon is present in considerable quantity, the unreacted hydrocarbon may be removed as an upper layer with a substantial proportion of the ester product dissolved therein to be subsequently separated by distillation. Separation of the reaction products may also be facilitated by addition of a small amount of water to the reaction products, thereby reducing the solubility of the ester in the acid. After separating the ester from the acid the latter may be restored to the desired concentration by the addition of acid anhydride which reacts with the water to form additional acid needed for make-up.

*Ethyl acetate*

Ethyl acetate was made according to the following procedure: A mixture of 480 g. of glacial acetic acid, 90 g. of boron fluoride, 90 g. of hydrogen fluoride, and 420 g. of ethylene was charged into an autoclave which was then heated for three hours at 150–170° C. The pressure dropped from 1800 to 1000 pounds per square inch during the heating at 150–170° C. The ethyl acetate was recovered from the crude reaction mixture in a manner similar to that used for butyl acetate. The yield of pure ethyl acetate boiling at 76–77° C. was 345 g. (49 percent).

In addition to the organic acids mentioned above we may also use the hydroxy acids, lactic, salicylic, tartaric, citric and maleic and the fatty acids, lauric, palmitic and the acids derived from fish oils and rosin. Other acids are sebacic, glutaric, fumaric, malonic and succinic.

The esters produced by the process of the present invention may be useful as solvents or plasticizers for cellulose derivatives, plastics, lacquers and coating materials.

In some instances it may be desirable to use an excess of ethylene over and above the amount theoretically required to combine with all the carboxylic acid present in order to drive the reaction to completion with respect to the acid employed.

Although we have described our process with respect to specific applications thereof, we contemplate including all those modifications of the process obvious to one skilled in the art, for example we contemplate the use of hydrogen in the reaction to increase the life of the catalyst, the hydrogen being employed, preferably under pressure, recovered from the product and recycled in the reaction. The term "organic acid" employed in the claims is intended to include the organic acid anhydrides.

We claim:

1. The process of making an ester of an organic acid which comprises intimately contacting said organic acid with ethylene in the presence of an esterification catalyst consisting essentially of a mixture of $BF_3$ and hydrofluoric acid until substantial esterification of the organic acid has been effected and thereafter recovering the desired ester from the reaction mixture.

2. The process of claim 1 wherein the ratio of $BF_3$ to hydrofluoric acid is about 1:1 by weight.

3. The process of esterifying an organic acid which comprises dissolving therein about 2 to 20 per cent of a mixture of HF and $BF_3$, intimately contacting the resulting solution with ethylene until the organic acid is substantially esterified, and thereafter recovering the desired ester from the reaction products.

4. The process of esterifying ethylene present in a light unsaturated hydrocarbon fraction from the conversion of petroleum which comprises intimately contacting an organic acid and said hydrocarbon fraction under sufficient pressure to maintain it substantially dissolved in the liquid phase in said organic acid with an esterification catalyst consisting essentially of a mixture of $BF_3$ and HF in the proportion of about 10:1 to 1:10, continuing the reaction until the organic acid is substantially esterified, and recovering the resulting ester from the reaction products.

5. The process of claim 4 wherein the process is conducted in a continuous manner and unreacted paraffinic constituents of said hydrocarbon fraction are separated by distillation from said reaction products together with a portion of the hydrogen fluoride catalyst and the hydrogen fluoride catalyst is recovered from said unreacted hydrocarbons by extraction with the organic acid charged to the esterification reaction.

6. The process of esterifying an organic acid which comprises intimately contacting said acid in liquid phase at a temperature in the range of about 0 to 200° C. with ethylene in the presence of an esterification catalyst comprised of $BF_3$ and HF, continuing the reaction until the said organic acid is substantially esterified, separating said esterification catalyst from the reaction products and employing said recovered esterification catalyst for the esterification of additional amounts of organic acid.

7. The process of esterifying an organic acid which comprises intimately contacting said acid in liquid phase at a temperature in the range of about 0 to 300° C. with ethylene in the presence of an esterification catalyst comprised of $BF_3$ and HF, said $BF_3$ and HF being in the proportion of about 2:1 to 1:3 and the amount of said $BF_3$—HF being in the range of about 2 to 20 per cent of the reacting ingredients, adjusting the proportion of ethylene to organic acid in the reacting mixture to provide an approximately equimolecular mixture of organic acid and ethylene, continuing the reaction until the organic acid is substantially esterified and recovering the resulting organic acid ester from the reaction products.

8. A continuous process for making an ester of an organic acid which comprises intimately contacting said organic acid with ethylene and an esterification catalyst consisting essentially of a mixture of $BF_3$ and hydrofluoric acid in an esterification reactor for a period of time sufficient to effect partial esterification of said organic acid, continuously removing and subjecting to a primary distillation step a portion of the contents of said esterification reactor, recovering from said primary distillation step a fraction comprising an ester, $BF_3$ and unconverted organic acid, subjecting said fraction to a secondary distillation step, recovering from said secondary distillation step an ester fraction and a fraction comprising $BF_3$ and unconverted organic acid, and recycling the last named fraction to said esterification reactor.

9. A continuous process for making an ester of an organic acid which comprises intimately contacting said organic acid with ethylene and an esterification catalyst consisting essentially of a mixture of $BF_3$ and hydrofluoric acid in an esterification reactor for a period of time sufficient to effect partial esterification of said organic acid, continuously removing and subjecting to a primary fractional distillation step a portion of the contents of said esterification reactor, separating a vapor fraction from said primary fractional distillation step, recovering from said primary fractional distillation step a liquid fraction comprising an ester, $BF_3$, and unconverted organic acid, subjecting said vapor fraction to absorption in an organic acid and passing organic acid enriched by the absorption operation directly to said esterification reactor, subjecting said liquid fraction to secondary fractional distillation step, recovering from said secondary fractional distillation step an ester fraction and a fraction comprising $BF_3$ and unconverted organic acid, and recycling the last named fraction to said esterification reactor.

ARTHUR E. BEARSE.
RICHARD D. MORIN.